United States Patent
Nishibu

(10) Patent No.: US 10,137,650 B2
(45) Date of Patent: Nov. 27, 2018

(54) FILAMENT WINDING APPARATUS

(71) Applicant: TOYOTA JIDOSHA KABUSHIKI KAISHA, Toyota-shi, Aichi-ken (JP)

(72) Inventor: Shiro Nishibu, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/878,656

(22) Filed: Jan. 24, 2018

(65) Prior Publication Data

US 2018/0236735 A1    Aug. 23, 2018

(30) Foreign Application Priority Data

Feb. 23, 2017 (JP) ................. 2017-031754

(51) Int. Cl.

| | | |
|---|---|---|
| B29C 70/50 | (2006.01) | |
| B29C 70/56 | (2006.01) | |
| B29C 70/32 | (2006.01) | |
| B65H 59/36 | (2006.01) | |
| B29K 63/00 | (2006.01) | |
| B29K 307/04 | (2006.01) | |

(52) U.S. Cl.
CPC .............. B29C 70/56 (2013.01); B29C 70/32 (2013.01); B65H 59/36 (2013.01); *B29K 2063/00* (2013.01); *B29K 2307/04* (2013.01)

(58) Field of Classification Search
CPC ........ B65H 81/02; B65H 81/06; B29C 70/32; B29C 70/56; B29C 53/56; B29C 53/66; B29C 53/602
See application file for complete search history.

(56) References Cited

U.S. PATENT DOCUMENTS

| | | | | |
|---|---|---|---|---|
| 9,962,886 | B2* | 5/2018 | Hatta | B29C 70/32 |
| 2005/0038222 | A1* | 2/2005 | Joshi | B29C 53/8066 528/44 |
| 2006/0096993 | A1* | 5/2006 | Takashima | F17C 1/06 220/588 |
| 2009/0071965 | A1* | 3/2009 | Iida | B29C 70/086 220/586 |
| 2009/0314872 | A1* | 12/2009 | Uozumi | B29C 53/8016 242/410 |
| 2012/0315569 | A1* | 12/2012 | Tanigawa | B29C 53/602 429/515 |
| 2015/0053808 | A1* | 2/2015 | Tanigawa | B29C 53/602 242/430 |
| 2015/0224720 | A1* | 8/2015 | Hatta | B65H 59/12 156/172 |
| 2016/0229756 | A1* | 8/2016 | Jarmon | C03C 14/002 |
| 2016/0339650 | A1* | 11/2016 | Ueda | B29C 70/68 |

FOREIGN PATENT DOCUMENTS

| | | |
|---|---|---|
| JP | 2007190697 A | 8/2007 |
| JP | 2016159446 A | 9/2016 |

* cited by examiner

*Primary Examiner* — Emmanuel M Marcelo
(74) *Attorney, Agent, or Firm* — Dickinson Wright, PLLC

(57) ABSTRACT

A filament winding apparatus includes a controller that controls the action of the filament winding apparatus. The controller includes a tension controller that controls a tension adjuster in such a way that an adjusted tension waveform that relates the rotation phase of a liner to the tension of a fiber adjusted by the tension adjuster has a phase opposite to the phase of a temporary tension waveform.

4 Claims, 8 Drawing Sheets

FILAMENT WINDING APPARATUS

CROSS-REFERENCE OF RELATED APPLICATION

The present application claims the priority based on Japanese Patent Application No. 2017-031754 filed on Feb. 23, 2017, the entire disclosure of which is incorporated herein by reference.

BACKGROUND

Field

The present disclosure relates to a technology for winding a fiber around a liner.

Related Art

In a filament winding apparatus, there is conventionally a known technology for supplying a liner having a cylindrical section with a fiber supplied through a fiber-bundle guide portion and winding the fiber around the surface of the liner (Japanese Patent Laid-Open No. 2007-190697, for example). In the conventional technology, when the fiber is wound around the surface of the liner, a rotary mechanism rotates the liner along the circumferential direction of the cylindrical section.

In the conventional technology, when the liner is rotated to wind the fiber around the liner, the liner circumferentially swings in some cases. The circumferential swing results, fox example, from deflection of the liner itself due to the rotation and the self-weight of the liner. The circumferential swing is further enhanced due to the centrifugal force produced by the rotation in a case where the center of gravity of the liner does not coincide with the axis of rotation of the rotating liner. Further, the circumferential swing tends to occur more markedly as the liner has a longer overall length. In the case where the liner circumferentially swings, the position where the fiber is wound around the liner is displaced with respect to the fiber-bundle guide portion, and the tension of the fiber to be wound around the liner therefore deviates from set tension in some cases in each position in the circumferential direction of the liner. The deviation in the tension produces lower-strength portions of a tank formed of the liner with the fiber wound therearound than the other portions of the tank. Therefore, to wind a fiber around a liner, a technology that allows the possibility of deviation in the tension of the fiber from set tension to be lowered has been desired.

SUMMARY

According to one form of the present disclosure, a filament winding apparatus is provided. The filament winding apparatus includes a fiber supplier that supplies a fiber toward a liner having a cylindrical section, a winder that rotates the liner along the circumferential direction of the cylindrical section to wind the fiber around the liner, a tension adjuster that adjusts the tension of the fiber supplied to the liner, and a controller that controls the action of the filament winding apparatus. The controller includes a tension amplitude estimator that estimates a tension amplitude that is the fluctuation width of the tension of the fiber wound around the liner based on the amount of circumferential swing of the liner rotated by the winder, a waveform generator that generates a temporary tension waveform that relates the rotation phase of the liner rotated by the winder to the tension of the fiber wound around the liner based on the estimated tension amplitude and predetermined set tension of the fiber to be wound around the liner, and a tension controller that controls the tension adjuster in such a way that an adjusted tension waveform that relates the rotation phase of the liner to the tension of the fiber adjusted by the tension adjuster has a phase opposite to the phase of the temporary tension waveform. According to the form described above, the tension controller controls the tension adjuster in such a way that the adjusted tension waveform has a phase opposite to the phase of the temporary tension waveform. As a result, the tension of the fiber supplied to the liner can be so adjusted that the tension amplitude resulting from the circumferential swing of the liner is canceled, whereby the possibility of deviation in the tension of the fiber wound around the liner from the set tension can be lowered.

DETAILED DESCRIPTION

A. Embodiment

Figure 1:
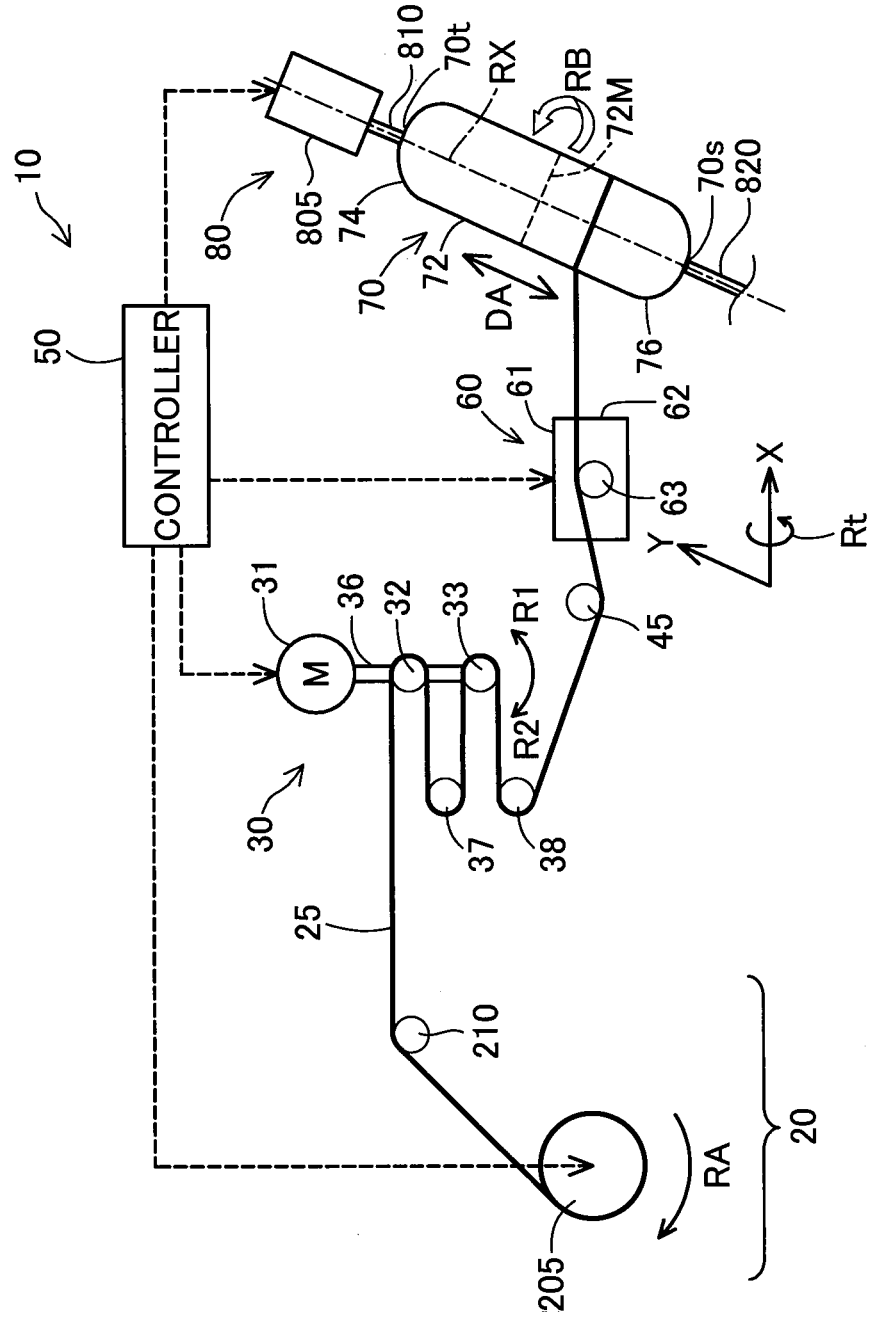
FIG. 1 is a schematic view of a filament winding apparatus according to an embodiment.

FIG. 1 is a schematic view showing the configuration of a filament winding apparatus 10 as an embodiment of the present disclosure. The filament winding apparatus 10 (hereinafter also referred to as "FW apparatus 10") imparts tension to a bundle of carbon fibers (hereinafter simply referred to as "fiber bundle 25") impregnated with a resin (thermoset epoxy resin, for example) and winds the fiber bundle 25 around the outer surface of a liner 70 in the form of a combination of hoop winding and helical winding. After the fiber bundle 25 is wound around the liner 70, post-processing, such as a thermal treatment for curing the resin, is performed to manufacture a tank having a reinforcing carbon-fiber layer formed thereon. The manufactured tank is used, for example, in a vehicle that incorporates a fuel cell as a drive source and used as a high-pressure hydrogen tank that accommodates hydrogen gas to be supplied to the fuel cell. The liner 70 has a cylindrical section 72, which has a cylindrical shape, and a pair of dome sections 74, 76, which are connected to both ends of the cylindrical section 72. The diameter of each of the dome sections 74 and 76 decreases as the distance from the cylindrical section 72 increases.

The FW apparatus 10 includes a fiber unwinder 20, a dancer 30 as a tension adjuster, a fiber supplier 60, a winder 80, and a controller 50. The controller 50 controls the action of the FW apparatus 10.

The fiber unwinder 20 includes a bobbin 205 and a transport roller 210. The fiber unwinder 20 has the function of unwinding the fiber bundle 25. The bobbin 205 is a tubular member, and the fiber bundle 25 is wound around the bobbin 205. The bobbin 205 rotates in the direction indicated by the arrow RA when the bobbin 205 is driven by an electric motor (not shown) controlled by the controller 50.

The rotation unwinds the fiber bundle 25 and directs it toward the downstream side in a transport path of the fiber bundle 25. The transport roller 210 transports the fiber bundle 25 unwound from the fiber unwinder 20 toward the dancer 30.

The dancer 30 adjusts the tension of the fiber bundle 25 supplied to the liner 70. Set tension set in the controller 50 specified in advance is produced by the difference between the supply speed of the fiber bundle 25 supplied to the liner. ID (speed of rotation of bobbin 205, for example) and the speed of rotation of the liner 70. The set tension is predetermined constant tension that is a target value in the operation of winding the fiber bundle 25 around the liner 70. On the other hand, the tension of the fiber bundle 25 deviates from the set tension due to circumferential swing of the liner 70, which will be described later. The deviation in the tension is adjusted by the dancer 30, whereby the deviation in the tension of the fiber bundle 25 is suppressed when the fiber bundle 25 is actually wound around the liner 70.

The dancer 30 includes a plurality of (two in the present embodiment) transport rollers 37, 38, a plurality of (two in the present embodiment) dancer rollers 32, 33, a motor 31, and a linkage member 36. Along the transport path of the fiber bundle 25 from the fiber unwinder 20 to the liner 70, the dancer roller 32, the transport roller 37, the dancer roller 33, and the transport roller 38 are arranged in this order from the upstream side of the transport path. The motor 31, when it is driven in accordance with an instruction from the controller 50, causes the linkage member 36 to pivot in the directions indicated by the arrows R1 and R2. The dancer rollers 32 and 33 are so attached to the linkage member 36 as to be rotatable and are movable in the directions indicated by the arrows R1 and R2 in accordance with the pivotal motion of the linkage member 36. The tension imparted to the fiber bundle 25 increases as the dancer rollers 32 and 33 move in the direction away from the transport roller 37 (direction indicated by arrow R1) with respect to a reference position of the dancer rollers 32 and 33 shown in FIG. 1. On the other hand, the tension imparted to the fiber bundle 25 decreases as the dancer rollers 32 and 33 move in the direction toward the transport roller 37 (direction indicated by arrow R2) with respect to the reference position of the dancer rollers 32 and 33 shown in FIG. 1. In the transport path of the fiber bundle 25, a transport roller 45 is disposed between the dancer 30 and the fiber supplier 60.

The fiber supplier 60 supplies the fiber bundle 25 toward the outer surface of the liner 70. The fiber supplier 60 includes a fiber exit section 61 and a guide roller 63. The fiber exit section 61 has an exit 62, through which the fiber bundle 25 is delivered toward the outer surface of the liner 70. The guide roller 63 is disposed in the fiber exit section 61 and transports the fiber bundle 25 in the fiber exit section 61 toward the exit 62.

The fiber supplier 60 can move in the direction along a Y axis (traverse axis) and the direction along an X axis (forward/rearward axis) perpendicular to the axis in accordance with an instruction from the controller 50. The direction along the Y axis is the direction along the longitudinal direction DA of the liner 70. The direction along the X axis is not only the direction perpendicular to the direction along the Y axis but the direction in which the fiber supplier 60 approaches and moves away from the liner 70. The fiber supplier 60 is rotatable along the direction indicated by the arrow Rt around the X axis in accordance with an instruction from the controller 50.

The winder 80 rotates the liner 70 in accordance with an instruction from the controller 50 to wind the fiber bundle 25 supplied from the fiber supplier 60 around the outer surface of the liner 70. The winder 80 rotates the liner 70 around the axis of rotation RX of the winder. That is, the winder 80 rotates the liner 70 along the circumferential direction of the cylindrical section 72 in the direction indicated by the arrow RB. The winder 80 includes a rotator 805, which rotates the liner 70, a rotating rod 810, and a support rod 820. The rotating rod 810 has one end fixed to the rotator 805 and the other fixed to the liner 70, specifically, one end thereof in the longitudinal direction DA. The support rod 820 supports the liner 70, specifically, the other end thereof in the longitudinal direction DA. When the rotator 805 operates, the rotating rod 810 turns and rotates the liner 70 around the center axis extending in the longitudinal direction DA. As described above, the winder 80 rotatably supports the liner 70, specifically, both ends 70s and 70t thereof in the longitudinal direction DA. The winder 80 winds the fiber bundle 25 around the liner 70 in the form of hoop winding and helical winding while rotating the liner 70. The hoop winding is a method for winding the fiber bundle 25 around the cylindrical section 72 of the liner 70 in the fixed circumferential direction with the fiber bundle 25 inclining by about 90° with respect to the axis (fiber orientation) of rotation RX, around which the liner 70 is rotated. The helical winding is a method for winding the fiber bundle 25 around the liner 74 with the fiber bundle 25 inclining by an angle ranging from 10° to 60° with respect to the axis of rotation RX.

Figure 2:
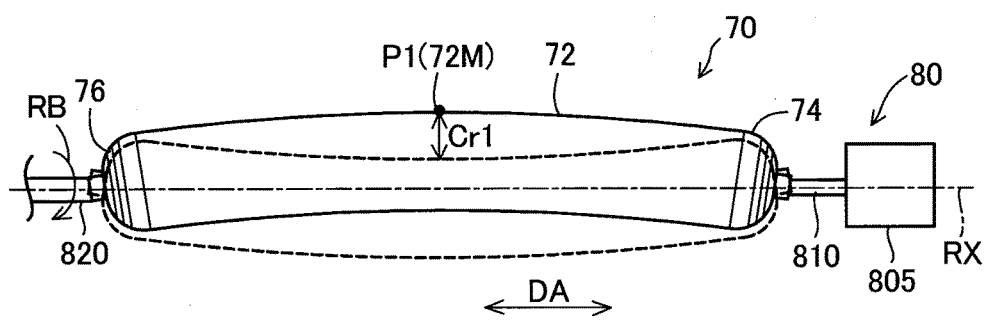
FIG. 2 describes circumferential swing.
Figure 3:
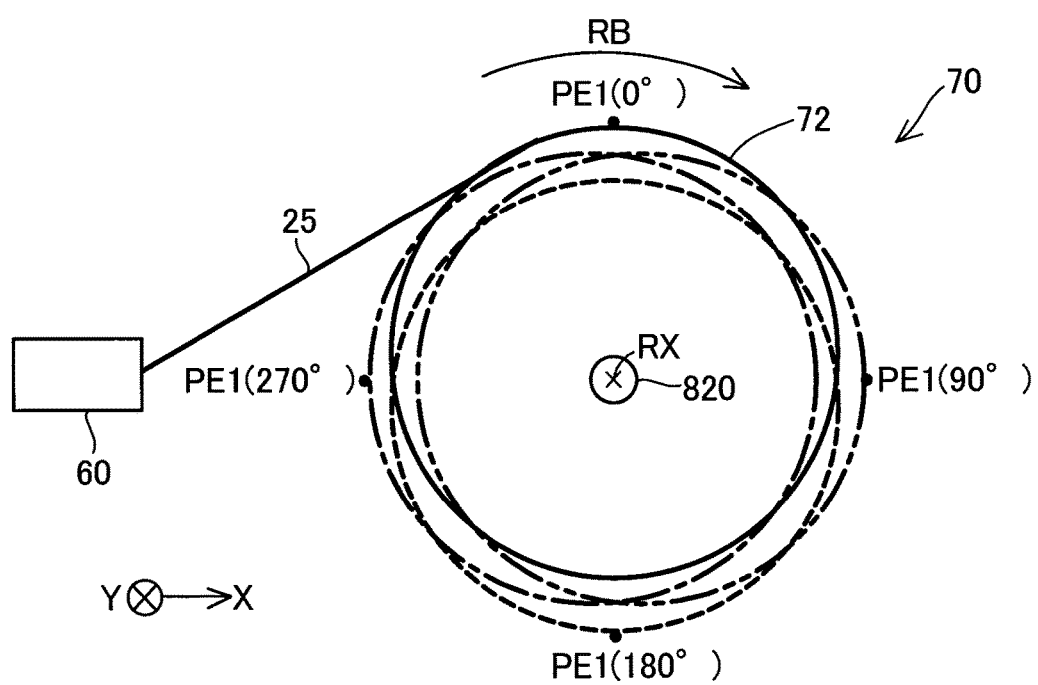
FIG. 3 describes tension amplitude.
Figure 4:
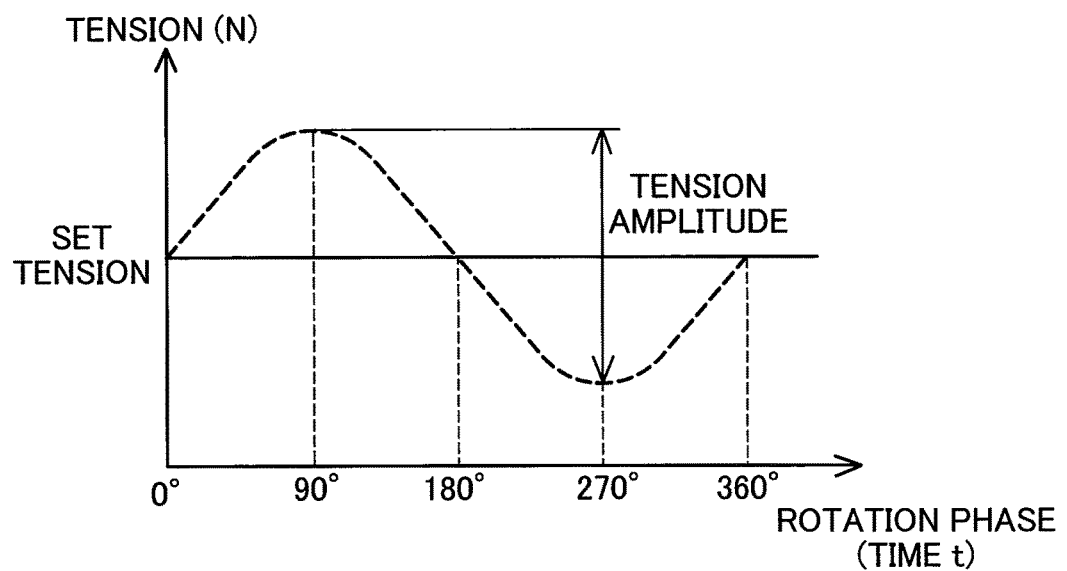
FIG. 4 shows a temporary tension waveform.

Before describing the controller 50 in detail, the circumferential swing of the liner 70 that occurs when the fiber bundle 25 is wound around the liner 70 and tension amplitude that is the fluctuation width of the tension imparted to the fiber bundle 25 supplied to the liner 70 will be described with reference to FIGS. 2 to 4. FIG. 2 describes the circumferential swing. FIG. 3 describes the tension amplitude. FIG. 4 shows a temporary tension waveform that relates the rotation phase of the liner 70 to the tension of the fiber wound around the cylindrical section 72 in a case where a tension controller that will be described later does not adjust the tension. The tension amplitude is the fluctuation width of the tension imparted to the fiber bundle 25 and is the difference between a maximum tension value and a minimum tension value.

When the liner 70 is rotated around the axial line of the axis of rotation RX of the winder 80 (straight line of datum axis) to wind the fiber bundle 25 around the liner 70, the liner 70 circumferentially swings in some cases, as shown in FIG. 2. The circumferential swing of the liner 70 is the magnitude of the displacement of the surface of the liner 70 (amount of circumferential swing) in a specified position and in a specified direction in the case where the liner 70 is rotated around the straight line of the datum axis. For example, consider a section of the surface of the cylindrical section 72, specifically, a section located at the center in the longitudinal direction DA of the liner 70 (central section 72M), and let a position P shown in FIG. 2 (upper position in FIG. 2) be the specified position and the upward/downward direction shown in FIG. 2 (that is, direction perpendicular to straight line of axis of rotation RX) be the specified direction. Under the definition described above, the magnitude of the displacement (amount of circumferential swing) has a value Cr1. The circumferential swing results, for example, from the deflection of the liner 70 itself due to its rotation and the self-weight of the liner 70. The circumferential swing is further enhanced due to the centrifugal force produced by the rotation in a case where the center of gravity of the liner 70 does not coincide with the axis of rotation RX. The circumferential swing tends to be enhanced as the overall length of the liner 70 increases. The amount of circumferential swing can, for example, be expressed by a value measured with a dial gauge in a state in which after the liner 70 is placed in the winder 80, the gauge head of the dial gauge is caused to be contact with the central section 72M and the liner 70 is rotated at a speed of rotation for the hoop winding.

In the case where the fiber bundle 25 is wound around the cylindrical section 72 of the liner 70 in the form of the hoop winding, the fiber supplier 60 successively moves in the Y-axis direction (direction along the axis of rotation RX) without movement in the X-axis direction, as shown in FIG. 3. Assuming that the rotation phase of the liner 70 is 0° when a point PE1 on the cylindrical section 72 is located at the top, the liner 70 is so displaced as to gradually move away from the fiber supplier 60 due to the circumferential swing as the rotation phase changes from 0° to 90°. As a result, the force at which the liner 70 pulls the fiber bundle 25 supplied from the fiber supplier 60 increases as the rotation phase changes from 0° to 90°. Therefore, in the case where the dancer 30 performs no tension adjustment, the tension of the fiber bundle 25 wound around the cylindrical section 72 gradually increases as the rotation phase changes from 0° to 90°, as shown in FIG. 4. Further, the circumferential swing causes the liner 70 to gradually approach the fiber supplier 60 as the potation phase changes from 90° to 270°. As a result, the throe at which the liner 70 pulls the fiber bundle 25 supplied from the fiber supplier 60 decreases as the rotation phase changes from 90° to 270°. Therefore, in the case where the dancer 30 performs no tension adjustment, the tension of the fiber bundle 25 wound around the cylindrical section 72 gradually decreases as the rotation phase changes from 90° to 270°, as shown in FIG. 4. Further, the circumferential swing causes the liner 70 to gradually move away from the fiber supplier 60 as the rotation phase changes from 270° to 360°. As a result, in the case where the dancer 30 performs no tension adjustment, the tension of the fiber bundle 25 wound around the cylindrical section 72 gradually increases as the rotation phase changes from 270° to 360°, as shown in FIG. 4. As described above, the circumferential swing of the liter 70 causes the tension of the fiber bundle 250 produced when the fiber bundle 25 is actually wound around the liner 70 to deviate from the set tension. In view of the fact described above, in the present embodiment, the controller 50 controls the dancer 30 in such a way that the tension of the fiber bundle 25 supplied to the liner 70 is so adjusted that the tension amplitude is canceled.

Figure 5:
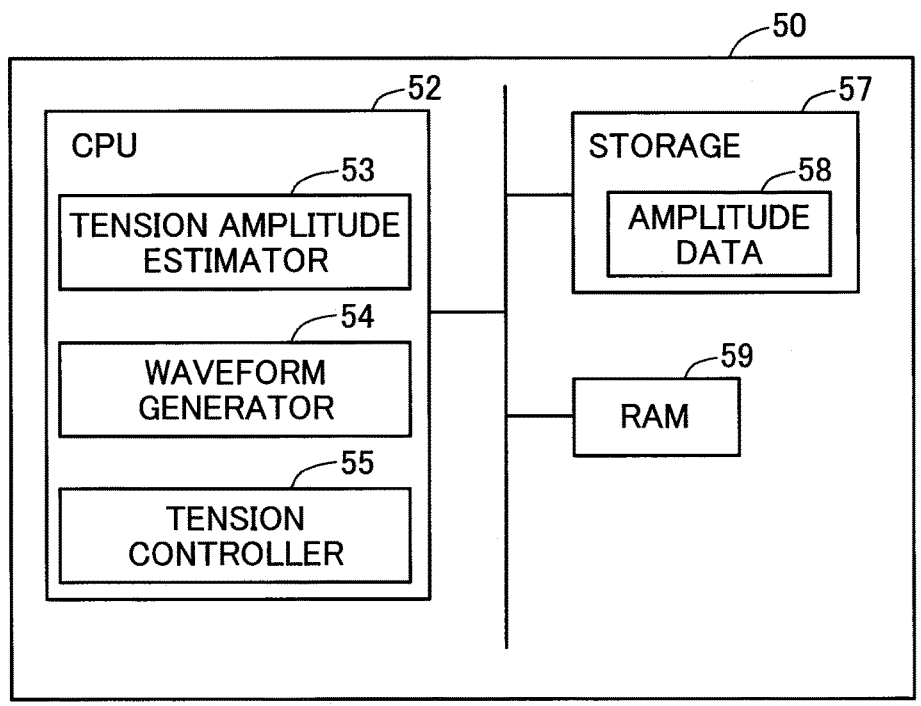
FIG. 5 is a functional block diagram of a controller.
Figure 6:
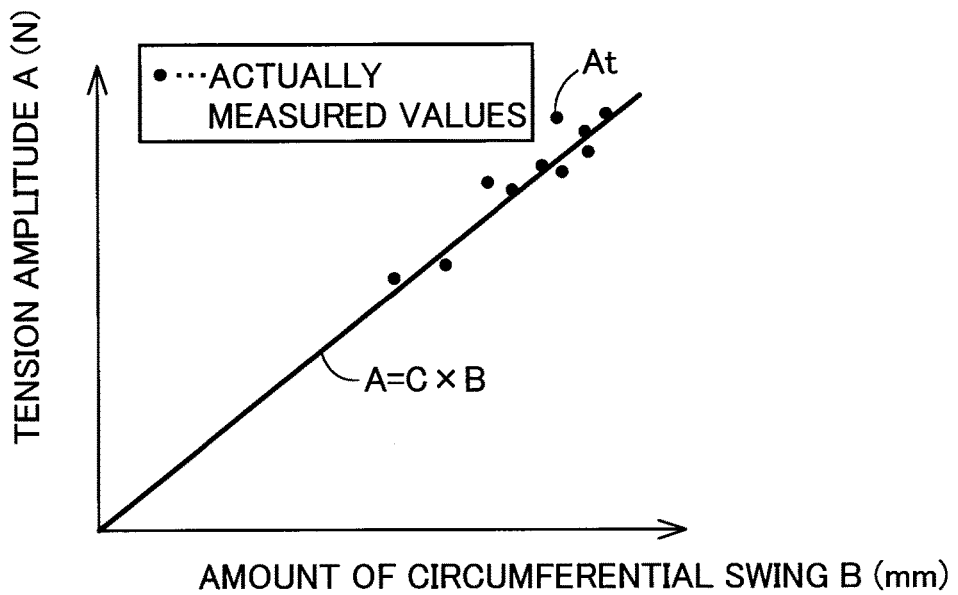
FIG. 6 describes amplitude data stored in a storage.

FIG. 5 is a functional block diagram of the controller 50. FIG. 6 describes amplitude data 58 stored in a storage 57. The controller 50 (FIG. 5) includes a CPU 52, the storage 57, and a RAM 59. The CPU 52 develops a program stored in the storage 57 in the RAM 59 and executes the program to function as a tension amplitude estimator 53, a waveform generator 54, and a tension controller 55.

The amplitude data 58 is data representing the relationship between the amount of circumferential swing B and a tension amplitude A, as shown in FIG. 6. In the present embodiment, the amplitude data 58 is a linear function representing the relationship between the amount of circumferential swing B and a tension amplitude A (A=C×B). The amplitude data 58 is created in the following procedure and stored in the storage 57. First, a plurality of liners 70, which are each a target around which the fiber bundle 25 is wound, are prepared. The plurality of prepared liners 70 have the same design dimension. For each of the plurality of prepared liners 70, an actually measured value At of the tension amplitude A is determined when the filament winding apparatus 10 is used to wind the fiber bundle 25 around the cylindrical section 72 with no tension adjustment performed by the dancer 30 (FIG. 6). The actually measured value At of the tension amplitude A may, for example, be a value in a case where the fiber bundle 25 is wound around the central section 72M of the cylindrical section 72 in the form of the hoop winding or a value in a case where the fiber bundle 25 is wound around the entire cylindrical section 72 along the longitudinal direction DA in the form of the hoop winding. The tension amplitude A is calculated based on a value detected with a tension sensor (not shown) that is provided in the FW apparatus 10 and detects the tension of the fiber bundle 25. The tension sensor is provided, for example, in the fiber exit section 61 and detects the tension based on the load exerted by the fiber bundle 25 on the guide roller 63. Since the amount of circumferential swing B varies due to dimension tolerance even when the liners 70 are so manufactured to have the same design dimension, the actually measured value At of the tension amplitude A also varies. The linear function representing the relationship between the amount of circumferential swing B and the tension amplitude A (A=C×B) is then calculated based on a plurality of calculated actually measured values At of the tension amplitude A. The data on the calculated linear function is stored as the amplitude data 58 in the storage 57.

The tension amplitude estimator 53 (FIG. 5) estimates the tension amplitude A of the fiber bundle 25 wound around the liner 70 based on the amount of circumferential swing B of the liner 70, which is the target around which the fiber bundle 25 is wound, and the amplitude data 58. Specifically, after the liner 70, which is the target around which the fiber bundle 25 is wound, is placed in the winder 80, the gauge head of a dial gauge is caused to come into contact with the surface of the cylindrical section 72. In this state, the value measured with the dial gauge in the state in which the liner 70 is rotated at a speed of rotation for the hoop winding is determined. The measured value is inputted as the amount of circumferential swing B to the controller 50, and the tension amplitude estimator 53 substitutes the inputted amount of circumferential swing B into the linear function, which is the amplitude data 58, to estimate the tension amplitude A. In the present embodiment, the tension amplitude estimator 53 substitutes the amount of circumferential swing B of the central section 72M (FIG. 1) of the liner 70, which is a section thereof in the longitudinal direction DA, into the linear function, which is the amplitude data 58, to estimate the tension amplitude A. The central section 72M is part of the cylindrical section 72.

The waveform generator 54 (FIG. 5) generates a temporary tension waveform based on the tension amplitude A estimated by the tension amplitude estimator 53 and the set tension. The temporary tension waveform is a waveform that relates the rotation phase of the liner 70 to the tension of the fiber bundle 25 wound around the cylindrical section 72 in the case where the liner 70 is rotated by the winder 80 for the hoop winding. That is, the temporary tension waveform is a waveform representing each rotation phase of the liner 70 and the tension of the fiber bundle 25 wound around the liner 70 at that phase. It is noted that the temporary tension waveform is a waveform in the case where the dancer 30 performs no tension adjustment.

The tension controller 55 controls the dancer 30 in such a way that an adjusted tension waveform that relates the rotation phase of the liner 70 to the tension of the fiber bundle 25 adjusted by the dancer 30 has a phase opposite to the phase of the temporary tension waveform. The adjusted tension waveform is specifically a waveform representing each rotation phase of the liner 70 and the tension of the fiber bundle 25 adjusted by the dancer 30 at that phase. When the dancer 30 adjusts the tension of the fiber bundle 25 in such a way that the adjusted tension waveform is achieved, the tension amplitude A is canceled, whereby the situation in which the tension of the fiber bundle 25 deviates from the set tension when the fiber bundle 25 is wound around the cylindrical section 72 in the form of the hoop winding can be suppressed.

Figure 7:
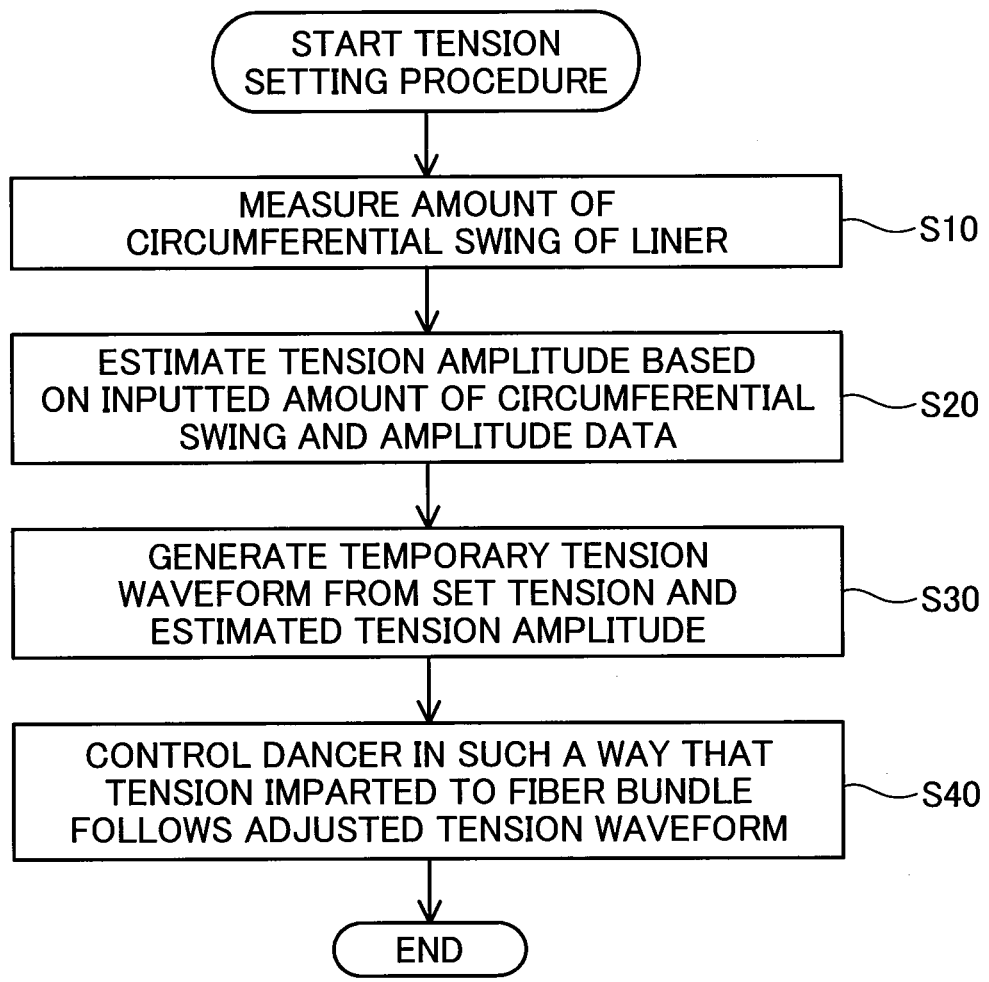
FIG. 7 is a flowchart of tension setting in a dancer.
Figure 8:
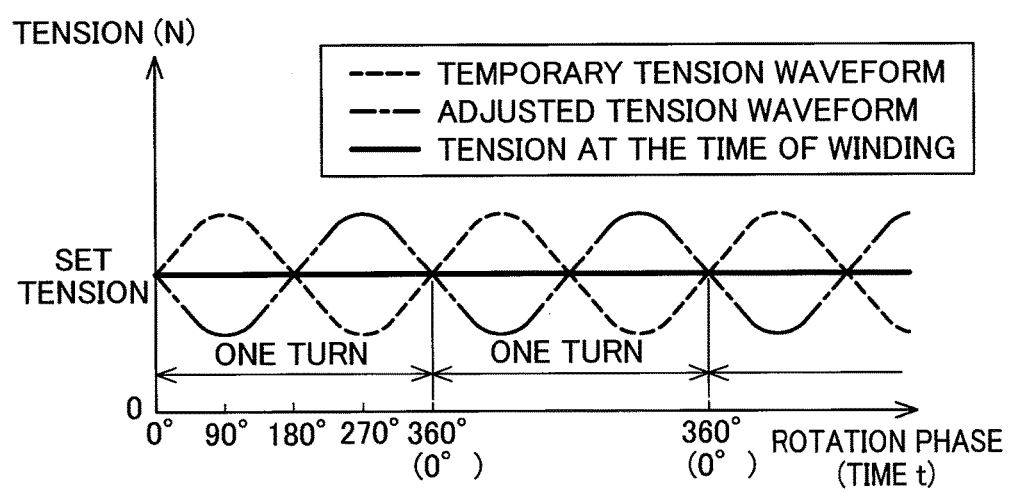
FIG. 8 describes tension at which a fiber is wound around a liner.

FIG. 7 is a flowchart of tension setting in the dancer 30. FIG. 8 describes the tension at which the fiber bundle 25 is wound around the liner 70.

A user first measures the amount of circumferential swing B of the liner 70, which is the target around which the fiber bundle 25 is wound step S10). The amount of circumferential swing B measured in step S10 is a value at the central section 72M of the liner 70. The central section 72M of the liner 70 forms part of the cylindrical section 72. The measurement of the amount of circumferential swing B is performed by using a dial gauge, as described above. To measure the amount of circumferential swing B, the liner 70 is rotated at the speed of rotation for the hoop winding. The measured amount of circumferential swing B is inputted to the controller 50 via an input section (not shown), such as a keyboard.

After step S10, the tension amplitude estimator 53 estimates the tension amplitude A based on the inputted amount of circumferential swing B and the amplitude data 58 (step S20). Specifically, the tension amplitude estimator 53 substitutes the inputted amount of circumferential swing B into the expression that represents the amplitude data 58 to estimate the tension amplitude A.

The waveform generator 54 then generates the temporary tension waveform from the set tension and the estimated tension amplitude (step S30). The temporary tension waveform is expressed by a sinusoidal function, as shown in FIG. 8. It is noted that the rotation phase of the liner 70 where the tension resulting from the circumferential swing is minimized (rotation phase of 270°, for example) and the rotation phase of the liner 70 where the tension resulting from the circumferential swing is maximized (rotation phase of 90°, for example) in the case where the liner 70 is rotated by the winder 80 to wind the fiber bundle 25 around the cylindrical section 72 in the form of the hoop winding have been determined in advance. The waveform generator 54 generates the temporary tension waveform from the set tension and the estimated tension amplitude in such a way that the maximum tension value and the minimum tension value correspond to the two rotation phases determined in advance. The tension controller 55 then generates an adjusted tension waveform having a phase shifted by 180° from the phase of the temporary tension waveform or having the phase opposite to the phase of the temporary tension waveform and controls the dancer 30 in such a way that the tension imparted to the fiber bundle 25 versus the rotation phase of the liner 70 follows the adjusted tension waveform (FIG. 8) (step S40 in FIG. 7). The maximum value of the tension shown by the adjusted tension waveform is equal to the maximum value of the tension shown by the temporary tension waveform, and the minimum value of the tension shown by the adjusted tension waveform is equal to the minimum value of the tension shown by the temporary tension waveform. In the present embodiment, when the fiber bundle 25 is wound around the cylindrical section 72 of the liner 70 in the form of the hoop winding, the dancer 30 is controlled in accordance with the process in step S40.

After the fiber bundle 25 is wound around the liner 70 in the forms of the hoop winding and the helical winding, post-processing, such as a thermal treatment, is performed on the liner 70. A tank formed of the liner 70 on the surface of which a reinforcing layer is provided is thus manufactured.

According to the embodiment described above, the tension controller 55 controls the dancer 30 in the hoop winding in such a way that an adjusted tension waveform having a phase opposite to the phase of the temporary tension waveform is achieved. As a result, the tension of the fiber bundle 25 supplied to the liner 70 can be so adjusted that the tension amplitude resulting from the circumferential swing of the liner 70 is canceled. The possibility of deviation in the tension of the fiber bundle wound around the liner 70 from the set tension can therefore be lowered.

Further, according to the embodiment described above, the storage 57 of the controller 50 stores the Amplitude data 58 representing the relationship between the amount of circumferential swing B and the tension amplitude A (FIG. 5). The tension amplitude estimator 53 can therefore readily estimate the tension amplitude A of the tension of the fiber bundle 25 wound around the liner 70.

In a case where the winder 80 rotates the liner 70 with both ends 70s and 70t thereof in the longitudinal direction DA supported, the amount of circumferential swing B of the liter 70 is likely to be maximized at the central section 72M. The tension amplitude A resulting from the amount of circumferential swing B is also maximized at the central section 72M. According to the embodiment described above, the tension controller 55 controls the dancer 30 by using the tension amplitude A estimated by the tension amplitude estimator 53 based on the amount of circumferential swing B at the central section 72M. As a result, the possibility of deviation in the tension of the fiber bundle 25 wound around the liner 70 from the set tension can be lowered at the central section 72M where the tension of the fiber bundle 25 it likely to deviate by the largest amount due to the circumferential swing when the fiber bundle 25 is wound around the liner 70.

Further, according to the embodiment described above, to wind the fiber bundle 25 around the cylindrical section 72 in the form of the hoop winding, the tension controller 55 controls the dancer 30 in such a way that the adjusted tension waveform has a phase opposite to the phase of the temporary tension waveform. As a result, the possibility of deviation in the tension of the fiber bundle 25 from the set tension can be lowered when the fiber bundle 25 is wound around the cylindrical section 72 in the form of the hoop winding.

B. Variations

The present disclosure is not limited to the example and embodiment described above and can be implemented in a variety of other aspects to the extent that they do not depart from the substance of the present disclosure. For example, the following variations are also conceivable:

B-1. First Variation:

In the embodiment described above, the storage 57 stores the amplitude data 58 (FIG. 5) but may not store the amplitude data 58. In this case, the controller 50 may use amplitude data 58 stored in an external apparatus to estimate the tension amplitude A of the tension of the fiber bundle 25 wound around the liner 70. The external apparatus is connected to the controller 50 over a network.

B-2. Second Variation:

In the embodiment described above, the tension amplitude estimator 53 estimates the tension amplitude A based on the amount of circumferential swing B of the central section 72M of the liner 70, but not limited to this. For example, the tension amplitude estimator 53 may estimate the tension amplitude A based on the amount of circumferential swing B of another portion of the cylindrical section 72. Still instead, the amounts of circumferential swing B of a plurality of different portions of the cylindrical section 72 may be measured along the longitudinal direction DA, and the tension amplitude estimator 53 may estimate the tension amplitude A for each of the plurality of measured amounts of circumferential swing B. In this case, the waveform generator 54 generates the temporary tension waveform for each of the estimated tension amplitudes A. In a case where the fiber bundle 25 is wound in the form of the hoop winding around a certain portion (first portion) out of the plurality of portions of the cylindrical section 72 in the longitudinal direction DA, the tension controller 55 controls the dancer 30 by using the adjusted tension waveform generated by using the amount of circumferential swing B of the first portion. Further, when the position where the fiber bundle 25 is wound moves from the first portion to another portion (second portion), the tension controller 55 controls the dancer 30 by using the adjusted tension waveform generated by using the amount of circumferential swing B of the second portion. The possibility of deviation in the tension of the fiber bundle 25 wound around the cylindrical section 72 from the set tension can therefore be further lowered.

B-3. Third Variation:

In the embodiment described above, the tension controller SS may control the dancer 30 by changing the peak value of the adjusted tension waveform (width of deviation from set tension) whenever the position where the fiber bundle 25 is wound around the cylindrical section 72 changes in the longitudinal direction DA. For example, in the case where the adjusted tension waveform is generated based on the amount of circumferential swing B of the central section 72M, the adjusted tension waveform for controlling the dancer 30 is so changed that the peak value is smaller than that of the generated adjusted tension waveform as the distance from the central section 72M increases in the longitudinal direction DA. Since the amount of circumferential swing B decreases as the distance from the central section 72M increases, the tension amplitude A resulting from the amount of circumferential swing B also decreases as the distance from the central section 72M increases. Changing the adjusted tension waveform for controlling the dancer 30 in such a way that the peak value decreases as the distance from the central section 72M increases in the longitudinal direction DA allows tension amplitude that may occur in each winding position of the cylindrical section 72 in the longitudinal direction DA to be canceled with higher accuracy. The possibility of deviation in the tension of the fiber bundle 25 wound around the cylindrical section 72 from the set tension can therefore be further lowered.

B-4. Fourth Variation:

In the embodiment described above, the tension controller 55 controls the dancer 30 when the fiber bundle 25 is wound around the cylindrical section 72 in the form of the hoop winding in such away that the adjusted tension waveform has a phase opposite to the phase of the temporary tension waveform. The same control may be performed when the fiber bundle 25 is wound around the liner 70 in the form of the helical winding.

The present disclosure is not limited to the embodiment, example, and variations described above and can be implemented in a variety of other configurations to the extent that they do not depart from the substance of the present disclosure. Further, in a case where any of the technical features of the present disclosure is not described as an essential feature in the present specification, the feature can be deleted as appropriate. For example, the present disclosure may be achieved in the aspect described below.

(1) According to one form of the present disclosure, a filament winding apparatus is provided. The filament winding apparatus includes a fiber supplier that supplies a fiber toward a liner having a cylindrical section, a winder that rotates the liner along the circumferential direction of the cylindrical section to wind the fiber around the liner, a tension adjuster that adjusts the tension of the fiber supplied to the liner, and a controller that controls the action of the filament winding apparatus. The controller includes a tension amplitude estimator that estimates a tension amplitude that is the fluctuation width of the tension of the fiber wound around the liner based on the amount of circumferential swing of the liner rotated by the winder, a waveform generator that generates a temporary tension waveform that relates the rotation phase of the liner rotated by the winder to the tension of the fiber wound around the liner based on the estimated tension amplitude and predetermined set tension of the fiber to be wound around the liner, and a tension controller that controls the tension adjuster in such a way that an adjusted tension waveform that relates the rotation phase of the liner to the tension of the fiber adjusted by the tension adjuster has a phase opposite to the phase of the temporary tension waveform. According to the form described above, the tension controller controls the tension adjuster in such a way that the adjusted tension waveform has a phase opposite to the phase of the temporary tension waveform. As a result, the tension of the fiber supplied to the liner can be so adjusted that the tension amplitude resulting from the circumferential swing of the liner is canceled, whereby the possibility of deviation in the tension of the fiber wound around the liner from the set tension can be lowered.

(2) In the form described above, the controller may further include a storage that stores amplitude data representing the relationship between the amount of circumferential swing and the tension amplitude, and the tension amplitude estimator may estimate the tension amplitude of the fiber wound around the liner based on the amount of circumferential swing of the liner around which the fiber is wound and the amplitude data. According to the form described above, the amplitude data stored in the storage can be used to readily estimate the tension amplitude of the fiber wound around the liner.

(3) In the form described above, the tension amplitude estimator may estimate the tension amplitude based on the amount of circumferential swing of a longitudinally central portion of the liner. In a case where the liner is rotated with both ends thereof supported, the amount of circumferential swing of the liner is likely to be maximized at the longitudinally central portion of the liner. The tension amplitude is also maximized at the portion where the amount of circumferential swing is maximized. According to the form described above, the tension controller controls the tension adjuster by using the tension amplitude estimated by the tension amplitude estimator based on the amount of circumferential swing of the central portion of the liner. As a result, at the central portion where the tension of the fiber to be wound around the liner is likely to vary by the largest amount, the possibility of deviation in the tension of the fiber wound around the liner from the set tension can be lowered.

(4) In the forth described above, the tension controller may control the tension adjuster in such a way that the adjusted tension waveform has a phase opposite to the phase of the temporary tension waveform at least when the fiber is wound around the cylindrical section in the form of hoop winding. According to the form described above, the possibility of deviation in the tension of the fiber to be wound around the cylindrical section from the set tension can be lowered.

The present disclosure can be achieved in a variety of forms other than the filament winding apparatus described above, for example, as a method for controlling the filament winding apparatus, a tank manufacturing apparatus using the filament winding apparatus, and a tank manufacturing method.

What is claimed is:

1. A filament winding apparatus comprising:
a fiber supplier that supplies a fiber toward a liner having a cylindrical section;
a winder that rotates the liner along a circumferential direction of the cylindrical section to wind the fiber around the liner;
a tension adjuster that adjusts tension of the fiber supplied to the liner; and
a controller that controls an action of the filament winding apparatus,
wherein the controller includes
a tension amplitude estimator that estimates a tension amplitude that is a fluctuation width of the tension of the fiber wound around the liner based on an amount of circumferential swing of the liner rotated by the winder,
a waveform generator that generates a temporary tension waveform that relates a rotation phase of the liner rotated by the winder to the tension of the fiber wound around the liner based on the estimated tension amplitude and predetermined set tension of the fiber to be wound around the liner, and
a tension controller that controls the tension adjuster in such a way that an adjusted tension waveform that relates the rotation phase of the liner to the tension of the fiber adjusted by the tension adjuster has a phase opposite to a phase of the temporary tension waveform.

2. The filament winding apparatus according to claim 1, wherein the controller further includes a storage that stores amplitude data representing a relationship between the amount of circumferential swing and the tension amplitude, and
the tension amplitude estimator estimates the tension amplitude of the fiber wound around the liner based on the amount of circumferential swing of the liner around which the fiber is wound and the amplitude data.

3. The filament winding apparatus according to claim 1, wherein the winder rotatably supports both ends of the liner in a longitudinal direction, and
the tension amplitude estimator estimates the tension amplitude based on the amount of circumferential swing of a longitudinally central portion of the liner.

4. The filament winding apparatus according to claim 1, wherein the tension controller controls the tension adjuster in such a way that the adjusted tension waveform has a phase opposite to a phase of the temporary tension waveform at least when the fiber is wound around the cylindrical section in a form of hoop winding.

* * * * *